United States Patent
Liu

(10) Patent No.: US 9,264,959 B2
(45) Date of Patent: Feb. 16, 2016

(54) COMMUNICATION METHOD AND ELECTRONIC DEVICE

(71) Applicants: Beijing Lenovo Software Ltd., Beijing (CN); Lenovo (Beijing) Limited, Beijing (CN)

(72) Inventor: Jianguo Liu, Beijing (CN)

(73) Assignees: Beijing Lenovo Software Ltd. (CN); Lenovo (Beijing) Limited (CN)

( * ) Notice: Subject to any disclaimer, the term of this patent is extended or adjusted under 35 U.S.C. 154(b) by 0 days.

(21) Appl. No.: 14/468,062

(22) Filed: Aug. 25, 2014

(65) Prior Publication Data

US 2015/0163713 A1     Jun. 11, 2015

(30) Foreign Application Priority Data

Dec. 9, 2013   (CN) .......................... 2013 1 0664559

(51) Int. Cl.
*H04W 36/14* (2009.01)
*H04W 36/36* (2009.01)

(52) U.S. Cl.
CPC ............. *H04W 36/14* (2013.01); *H04W 36/36* (2013.01)

(58) Field of Classification Search
CPC .............................. H04W 36/36; H04W 36/14
USPC ................................................ 455/435.2, 436
See application file for complete search history.

(56) References Cited

U.S. PATENT DOCUMENTS

| 8,149,733 | B2 * | 4/2012 | Basu et al. | 370/254 |
|---|---|---|---|---|
| 2007/0249354 | A1 * | 10/2007 | Seo et al. | 455/436 |
| 2010/0159922 | A1 * | 6/2010 | Tronc et al. | 455/427 |

* cited by examiner

*Primary Examiner* — Qutbuddin Ghulamali
(74) *Attorney, Agent, or Firm* — Schwegman Lundberg & Woessner, P.A.

(57) ABSTRACT

A communication method comprises: starting, at time T1, searching for a first communication network and reading a first network parameter; terminating, at time T2, the searching for the first communication network; determining, when the first communication network has been found, whether the reading of the first network parameter has been completed, when completed, matching the first network parameter with the first communication network, and registering with the first communication network; when the first communication network has not been found or when the first network parameter does not match the first communication network, stopping the reading of the first network parameter and starting reading the second network parameter when the type of network corresponding to the network parameter is inconsistent with the first network parameter and after reading, searching for the second communication network based on the second network parameter and registering with the found second communication network.

16 Claims, 5 Drawing Sheets

COMMUNICATION METHOD AND ELECTRONIC DEVICE

CROSS-REFERENCE TO RELATED APPLICATION

This application claims priority to the Chinese Patent Application No. 201310664559.X, filed on Dec. 9, 2013, entitled "Communication Method and Electronic Device", which is incorporated herein by reference in its entirety.

TECHNICAL FIELD

The present disclosure relates to communication technology, and more particularly, to communication methods and electronic devices.

BACKGROUND

Currently, a communication card, such as a User Identity Module (UIM) card, in a mobile terminal may include two sets of network parameters. One set of network parameters is used for communicating with one type of network, e.g., Code Division Multiple Access (CDMA) network parameters can be used for communicating with a CDMA network, and the other set of network parameters is used for communicating with another type of network, e.g., Global System of Mobile Communication (GSM) network parameters can be used for communicating with a GSM network. When the mobile terminal is powered on and conducts network search, it has to complete reading of these two sets of parameters sequentially before starting searching the network. Thus, the time for network search is relatively long, which degrades user experience.

SUMMARY

In light of the above, embodiments of the present disclosure provide a communication method and an electronic device capable of reducing the time required for a mobile terminal to find a network after power-on.

A communication method is provided. The method is applied in an electronic device capable of communicating with a first communication network and a second communication network. The method comprises:

starting, at time T1, searching for the first communication network and reading a first network parameter associated with the first communication network, wherein a second network parameter associated with the second network parameter is to be read by default after said reading of the first network parameter has been completed; terminating, at time T2, said searching for the first communication network to obtain a first search result; determining, when the first search result indicates that the first communication network has been found, whether said reading of the first network parameter has been completed at the time T2 to obtain a first determination result, matching the first network parameter with the first communication network to obtain a first match result when the first determination result indicates that said reading of the first network parameter has been completed at the time T2, and registering with the first communication network when the first match result indicates that first network parameter matches the first communication network; detecting, when the first search result indicates that the first communication network has not been found or when the first match result indicates that the first network parameter does not match the first communication network, a type of the network parameter read at the time T2 to obtain a first detection result, stopping said reading of the first network parameter and starting reading the second network parameter when the first detection result indicates that the type of the network parameter read at the time T2 is inconsistent with the first network parameter, and searching, at time T3 after said reading of the second network parameter has been completed, for the second communication network based on the second network parameter and registering with the found second communication network. The time T3 is later than the time T2 and the time T2 is later than the time T1.

An electronic device is provided. The electronic device is capable of communicating with a first communication network and a second communication network. The electronic device comprises: a searching unit configured to start, at time T1, searching for the first communication network; a reading unit configured to start, at the time T1, reading a first network parameter associated with the first communication network and to read, by default, a second network parameter associated with the second network parameter after said reading of the first network parameter has been completed; the searching unit being further configured to terminate, at time T2, said searching for the first communication network to obtain a first search result; a determining unit configured to determine, when the first search result indicates that the first communication network has been found, whether said reading of the first network parameter has been completed at the time T2 to obtain a first determination result; a matching unit configured to match the first network parameter with the first communication network to obtain a first match result when the first determination result indicates that said reading of the first network parameter has been completed at the time T2; a registering unit configured to register with the first communication network when the first match result indicates that first network parameter matches the first communication network; a detecting unit configured to detect, when the first search result indicates that the first communication network has not been found or when the first match result indicates that the first network parameter does not match the first communication network, a type of the network parameter read at the time T2 to obtain a first detection result; the reading unit being further configured to stop said reading of the first network parameter and start reading the second network parameter when the first detection result indicates that the type of the network parameter read at the time T2 is inconsistent with the first network parameter, and to notify the searching unit at time T3 after said reading of the second network parameter has been completed; the searching unit being further configured to search for the second communication network based on the second network parameter in response to receipt of the notification from the reading unit; and the registering unit being further configured to register with the found second communication network. The time T3 is later than the time T2 and the time T2 is later than the time T1.

With the solutions according to the embodiments of the present disclosure, when an electronic device is powered on, it searches a first communication network initially and, at the same time, reads a first network parameter associated with the first communication network. A second network parameter associated with the second network parameter is to be read by default after the reading of the first network parameter has been completed. When the first communication network has been found, the read first network parameter is matched with the first communication network. Then, the electronic device is registered with the first communication network if the matching succeeds. When the first communication network has not been found, the second network parameter is read, and the second communication network is searched for based on the second network parameter. It is then registered with the found second communication network. In this way, the time required for the electronic device to find a network after power-on can be significant reduced. Compared with the conventional solutions, the time for reading the first or second network parameter can be reduced, thereby improving user experience.

DETAILED DESCRIPTION OF THE EMBODIMENTS

In the following, the implementation of the present disclosure will be described in detail with reference to the figures, so as to facilitate thorough understanding of the characteristics and technical contents of the present disclosure. The figures are provided for the purpose of illustration only, rather than limiting the present disclosure.

Figure 1:
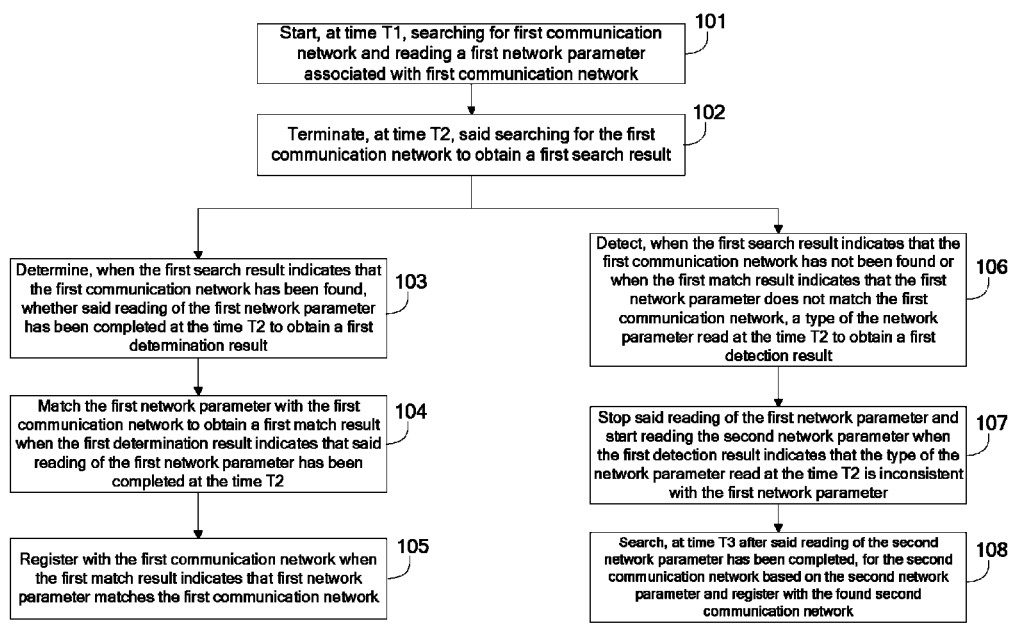
FIG. 1 is a flowchart illustrating a communication method according to a first embodiment of the present disclosure.

FIG. 1 is a flowchart illustrating a communication method according to a first embodiment of the present disclosure. In this example, the communication method is applied in an electronic device capable of communicating with a first communication network and a second communication network. As shown in FIG. 1, in a preferred embodiment of the present disclosure, the communication method includes the following steps.

At step 101, searching for the first communication network and reading a first network parameter associated with the first communication network are started at time T1.

Typically, the electronic device includes communication modules, such as a card management module, a network management module and a protocol stack module, for reading network parameters from a communication card in the electronic device upon power-on. In this embodiment, the communication card may be a UIM card that includes two sets of network parameters: a CDMA network parameter and a GSM network parameter. Here, the CDMA parameter may have a higher priority than the GSM parameter, such that the electronic device first searches a CDMA communication network based on the CDMA network parameter. When the search for the CDMA communication network fails, the electronic device then searches for a GSM communication network based on the GSM network parameter. It can be appreciated that the communication method according to this embodiment can be applied to other communication cards including two sets of network parameters, such as a Subscriber Identity Module (SIM) card.

Here, each of the first and second network parameters includes information required for network access, such as files including $EF_{IMSI\_M}$, EFIMSI_T, $EF_{TMSI}$, $EF_{CDMAHOME}$, and Preferred Roaming List (PRL).

In particular, when the electronic device is powered on, an instruction is triggered (this time instant is referred to as T1). The network management module in the electronic device starts searching for the first communication network and, at the same time, the card management module in the electronic device starts reading the first network parameter associated with the first communication network.

By default, a second network parameter associated with the second network parameter is to be read after the reading of the first network parameter has been completed. That is, the first and second network parameters are read sequentially in case of receiving no stop instruction.

At step 102, at time T2, the searching for the first communication network is terminated to obtain a first search result. Then the method proceeds with step 103 or 106.

Here, the electronic device searches for the first communication network during the time period from the time T1 to the time T2. The first search result may be obtained at the time T2.

The first search result may indicate that the first communication has or has not been found.

At step 103, when the first search result indicates that the first communication network has been found, it is determined whether the reading of the first network parameter has been completed at the time T2 to obtain a first determination result.

In this case, the first communication network has been found at the time T2, and it is then required to determine whether the reading of the first network parameter has been completed.

At step 104, when the first determination result indicates that the reading of the first network parameter has been completed at the time T2, the first network parameter is matched with the first communication network to obtain a first match result.

Here, the step of matching the first network parameter is matched with the first communication network may include the following operations. The electronic device creates a full scan list of frequencies based on the PRL file, and sequentially captures frequencies in accordance with the list. After capturing the frequencies successfully, the electronic device searches for the strongest pilot, reads communication channel information, and obtains system information/frequency information (SID/NID) of the first communication network. Then, the obtained SID/NID may be matched with the PRL list.

At step 105, when the first match result indicates that first network parameter matches the first communication network, the electronic device is registered with the first communication network and the process ends.

At step 106, when the first search result indicates that the first communication network has not been found or when the first match result indicates that the first network parameter does not match the first communication network, a type of the network parameter read at the time T2 is detected to obtain a first detection result.

Here, at the time T2, when the first communication network has not been found or when the first match result indicates that the first network parameter does not match the first communication network, it is required to detect whether the second network parameter is being read currently, in order to allow the electronic device to be registered with the second communication network as quickly as possible.

At step 107, when the first detection result indicates that the type of the network parameter read at the time T2 is inconsistent with the first network parameter, the reading of the first network parameter is stopped and the reading the second network parameter is started.

Here, at the time T2 even when the first network parameter is being read, the reading of the first network parameter is stopped, and reading the second network parameter is started immediately.

At step 108, at time T3 after the reading of the second network parameter has been completed, the second communication network is searched for based on the second network parameter and the electronic device is registered with the found second communication network.

Here, the found second communication network may be matched with the second network parameter. The matching operation of the second network parameter with the second communication network is the same as the matching operation of the first network parameter with the first communication network in the step 104, and the description thereof will thus be omitted here.

With the above embodiment of the present disclosure, when the first communication network is found, the electronic device may be registered with the first communication network based on the first network parameter that has been read first. When the first communication network is not found, the second network parameter may be read immediately, and the electronic device may be registered with the second communication network based on the read second network parameter. In this way, the time required for the electronic device to find a network after power-on can be effectively reduced since the time for reading the first or second network parameter can be reduced.

Figure 2:
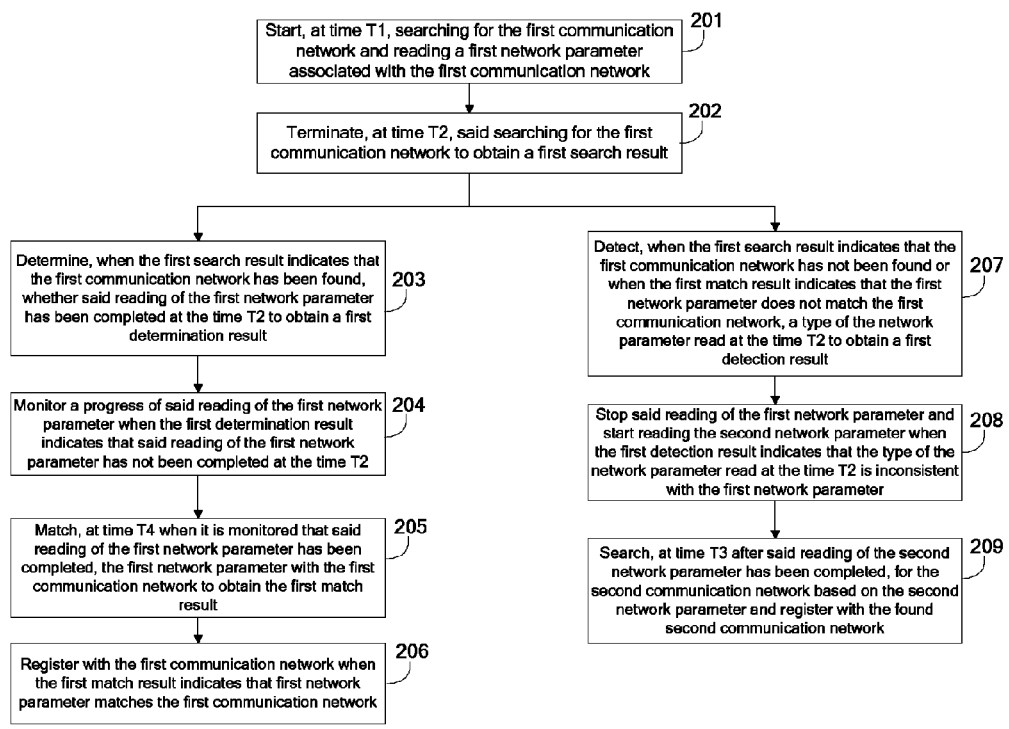
FIG. 2 is a flowchart illustrating a communication method according to a second embodiment of the present disclosure.

FIG. 2 is a flowchart illustrating a communication method according to a second embodiment of the present disclosure. In this example, the communication method is applied in an electronic device capable of communicating with a first communication network and a second communication network. As shown in FIG. 2, in another preferred embodiment of the present disclosure, the communication method includes the following steps.

At step 201, searching for the first communication network and reading a first network parameter associated with the first communication network are started at time T1.

Typically, the electronic device includes communication modules, such as a card management module, a network management module and a protocol stack module, for reading network parameters from a communication card in the electronic device when the electronic device is powered on. In this embodiment, the communication card can be a UIM card that includes two sets of network parameters: a CDMA network parameter and a GSM network parameter. Here the CDMA parameter can have a higher priority than the GSM parameter, such that the electronic device first searches a CDMA communication network based on the CDMA network parameter. When the search for the CDMA communication network fails, the electronic device then searches for a GSM communication network based on the GSM network parameter. It can be appreciated that the communication method according to this embodiment can be applied to other communication cards including two sets of network parameters, such as a SIM card.

Here, each of the first and second network parameters includes information required for network access, e.g., files such as $EF_{IMSI\_M}$, EFIMSI_T, $EF_{TMSI}$, $EF_{CDMAHOME}$ and PRL.

In particular, when the electronic device is powered on, an instruction is triggered (this time instant is referred to as T1). The network management module in the electronic device starts searching for the first communication network and, at the same time, the card management module in the electronic device starts reading the first network parameter associated with the first communication network.

By default, a second network parameter associated with the second network parameter is to be read after the reading of the first network parameter has been completed. That is, the first and second network parameters will be read sequentially in case of receiving no stop instruction.

At step 202, at time T2, the searching for the first communication network is terminated to obtain a first search result. Then the method proceeds with step 203 or 206.

Here, the electronic device searches for the first communication network during the time period from the time T1 to the time T2. The first search result may be obtained at the time T2.

The first search result may indicate that the first communication has or has not been found.

At step 203, when the first search result indicates that the first communication network has been found, it is determined whether the reading of the first network parameter has been completed at the time T2 to obtain a first determination result.

In this case, the first communication network has been found at the time T2 and it is then required to determine whether the reading of the first network parameter has been completed.

At step 204, when the first determination result indicates that the reading of the first network parameter has not been completed at the time T2, a progress of the reading of the first network parameter is monitored.

At step 205, at time T4 when it is monitored that the reading of the first network parameter has been completed, the first network parameter is matched with the first communication network to obtain a first match result.

Here, the step of matching the first network parameter with the first communication network includes the following operations. The electronic device creates a full scan list of frequencies based on the PRL file and sequentially captures frequencies in accordance with the list. After capturing the frequencies successfully, the electronic device searches for the strongest pilot, reads communication channel information and obtains system information/frequency information (SID/NID) of the first communication network. Then, the obtained SID/NID may be matched with the PRL list.

Here, the time T4 is later than the time T2.

At step 206, when the first match result indicates that first network parameter matches the first communication network, the electronic device is registered with the first communication network, and the process ends.

At step 207, when the first search result indicates that the first communication network has not been found or when the first match result indicates that the first network parameter does not match the first communication network, a type of the network parameter read at the time T2 is detected to obtain a first detection result.

Here, at the time T2, when the first communication network has not been found or when the first match result indicates that the first network parameter does not match the first communication network, it is required to detect whether the second network parameter is being read currently, so as to allow the electronic device to be registered with the second communication network as quickly as possible.

At step 208, when the first detection result indicates that the type of the network parameter read at the time T2 is inconsistent with the first network parameter, the reading of the first network parameter is stopped and the reading the second network parameter is started.

Here, at the time T2 when the first network parameter is being read, it is required to stop the reading of the first network parameter and start reading the second network parameter immediately.

At step 209, at time T3 after the reading of the second network parameter has been completed, the second communication network is searched for based on the second network parameter, and the electronic device is registered with the found second communication network.

Here, the found second communication network matches the second network parameter. The matching operation of the second network parameter with the second communication network is the same as the matching operation of the first network parameter with the first communication network in the step 205, and the description thereof will thus be omitted here.

With the above embodiment of the present disclosure, when the first communication network is found, the electronic device may be registered with the first communication network based on the first network parameter that has been read first. When the first communication network is not found, the second network parameter may be read immediately and the electronic device may be registered with the second communication network based on the read second network parameter. In this way, the time required for the electronic device to find a network after power-on can be effectively reduced since the time for reading the first or second network parameter can be reduced.

Figure 3:
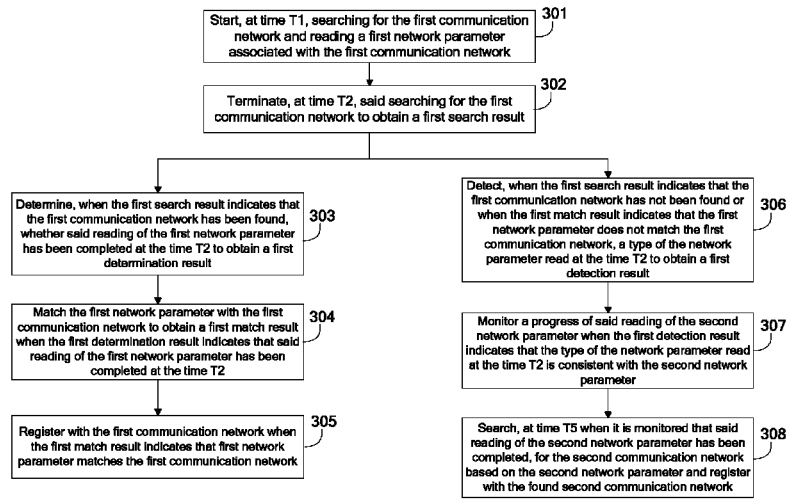
FIG. 3 is a flowchart illustrating a communication method according to a third embodiment of the present disclosure.

FIG. 3 is a flowchart illustrating a communication method according to a third embodiment of the present disclosure. In this example, the communication method is applied in an electronic device capable of communicating with a first communication network and a second communication network. As shown in FIG. 3, in another preferred embodiment of the present disclosure, the communication method includes the following steps.

At step 301, searching for the first communication network and reading a first network parameter associated with the first communication network are started at time T1.

Typically, the electronic device includes communication modules, such as a card management module, a network management module and a protocol stack module, for reading network parameters from a communication card in the electronic device when the electronic device is powered on. In this embodiment, the communication card can be a UIM card that includes two sets of network parameters: a CDMA network parameter and a GSM network parameter. Here the CDMA parameter may have a higher priority than the GSM parameter, such that the electronic device first searches a CDMA communication network based on the CDMA network parameter. When the search for the CDMA communication network fails, the electronic device then searches for a GSM communication network based on the GSM network parameter. It can be appreciated that the communication method according to this embodiment can be applied to other communication cards including two sets of network parameters, such as a SIM card.

Here, each of the first and second network parameters includes information required for network access, e.g., files such as $EF_{IMSI\_M}$, $EFIMSI\_T$, $EF_{TMSI}$, $EF_{CDMAHOME}$ and PRL.

In particular, when the electronic device is powered on, an instruction is triggered (this time instant is referred to as T1). The network management module in the electronic device starts searching for the first communication network and, at the same time, the card management module in the electronic device starts reading the first network parameter associated with the first communication network.

By default, a second network parameter associated with the second network parameter is to be read after the reading of the first network parameter has been completed. That is, the first and second network parameters will be read sequentially in case of receiving no stop instruction.

At step 302, at time T2, the searching for the first communication network is terminated to obtain a first search result. Then the method proceeds with step 303 or 306.

Here, the electronic device searches for the first communication network during the time period from the time T1 to the time T2. The first search result may be obtained at the time T2.

The first search result may indicate that the first communication has or has not been found.

At step 303, when the first search result indicates that the first communication network has been found, it is determined whether the reading of the first network parameter has been completed at the time T2 to obtain a first determination result.

In this case, the first communication network has been found at the time T2, and it is then required to determine whether the reading of the first network parameter has been completed.

At step 304, when the first determination result indicates that the reading of the first network parameter has been completed at the time T2, the first network parameter is matched with the first communication network to obtain a first match result.

Here, the step of matching the first network parameter is matched with the first communication network includes the following operations. The electronic device creates a full scan list of frequencies based on the PRL file and sequentially captures frequencies in accordance with the list. After capturing the frequencies successfully, the electronic device searches for the strongest pilot, reads communication channel information, and obtains system information/frequency information (SID/NID) of the first communication network. Then, the obtained SID/NID may be matched with the PRL list.

At step 305, when the first match result indicates that first network parameter matches the first communication network, the electronic device is registered with the first communication network and the process ends.

At step 306, when the first search result indicates that the first communication network has not been found or when the first match result indicates that the first network parameter does not match the first communication network, a type of the network parameter read at the time T2 is detected to obtain a first detection result.

Here, at the time T2, when the first communication network has not been found or when the first match result indicates that the first network parameter does not match the first communication network, it is required to detect whether the second network parameter is being read currently, so as to allow the electronic device to be registered with the second communication network as quickly as possible.

At step 307, when the first detection result indicates that the type of the network parameter read at the time T2 is consistent with the second network parameter, a progress of the reading of the second network parameter is monitored.

At step 308, at time T5 when it is monitored that the reading of the second network parameter has been completed, the second communication network is searched for based on the second network parameter, and the electronic device is registered with the found second communication network.

Here, the found second communication network is matched with the second network parameter. The matching operation of the second network parameter with the second communication network is the same as the matching operation of the first network parameter with the first communication network in the step 304, and the description thereof will thus be omitted here.

With the above embodiment of the present disclosure, when the first communication network is found, the electronic device may be registered with the first communication network based on the first network parameter that has been read first. When the first communication network is not found, the second network parameter may be read immediately and the electronic device may be registered with the second communication network based on the read second network parameter. In this way, the time required for the electronic device to find a network after power-on can be effectively reduced since the time for reading the first or second network parameter can be reduced.

Figure 4:
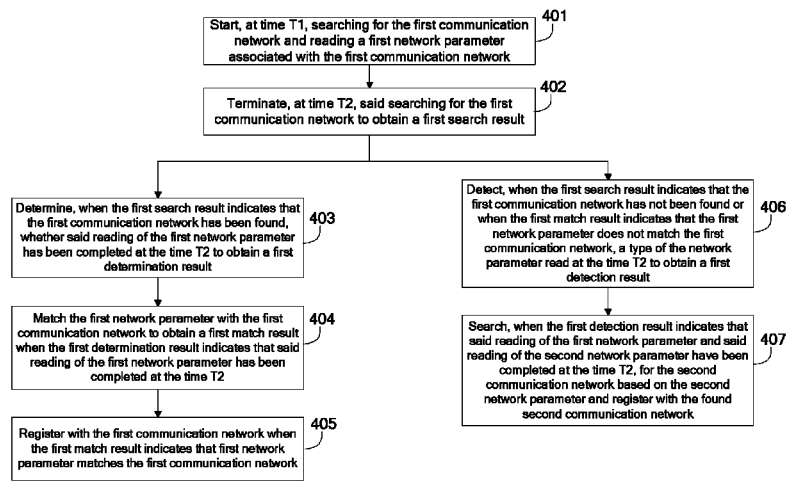
FIG. 4 is a flowchart illustrating a communication method according to a fourth embodiment of the present disclosure.

FIG. 4 is a flowchart illustrating a communication method according to a fourth embodiment of the present disclosure. In this example, the communication method is applied in an electronic device capable of communicating with a first communication network and a second communication network. As shown in FIG. 4, in another preferred embodiment of the present disclosure, the communication method includes the following steps.

At step 401, searching for the first communication network and reading a first network parameter associated with the first communication network are started at time T1.

Typically, the electronic device includes communication modules, such as a card management module, a network management module and a protocol stack module, for reading network parameters from a communication card in the electronic device when the electronic device is powered on. In this embodiment, the communication card can be a UIM card that includes two sets of network parameters: a CDMA network parameter and a GSM network parameter. Here the CDMA parameter may have a higher priority than the GSM parameter, such that the electronic device first searches a CDMA communication network based on the CDMA network parameter. When the search for the CDMA communication network fails, the electronic device then searches for a GSM communication network based on the GSM network parameter. It can be appreciated that the communication method according to this embodiment can be applied to other communication cards including two sets of network parameters, such as a SIM card.

Here, each of the first and second network parameters includes information required for network access, e.g., files such as $EF_{IMSI\_M}$, $EFIMSI\_T$, $EF_{TMSI}$, $EF_{CDMAHOME}$ and PRL.

In particular, when the electronic device is powered on, an instruction will be triggered (this time instant is referred to as T1). The network management module in the electronic device starts searching for the first communication network and, at the same time, the card management module in the electronic device starts reading the first network parameter associated with the first communication network.

By default, a second network parameter associated with the second network parameter is to be read after the reading of the first network parameter has been completed. That is, the first and second network parameters will be read sequentially in case of receiving no stop instruction.

At step 402, at time T2, the searching for the first communication network is terminated to obtain a first search result. Then the method proceeds with step 403 or 406.

Here, the electronic device searches for the first communication network during the time period from the time T1 to the time T2. The first search result can be obtained at the time T2.

The first search result may indicate that the first communication has or has not been found.

At step 403, when the first search result indicates that the first communication network has been found, it is determined whether the reading of the first network parameter has been completed at the time T2 to obtain a first determination result.

In this case, the first communication network has been found at the time T2 and it is then required to determine whether the reading of the first network parameter has been completed.

At step 404, when the first determination result indicates that the reading of the first network parameter has been completed at the time T2, the first network parameter is matched with the first communication network to obtain a first match result.

Here, the step of matching the first network parameter with the first communication network includes the following operations. The electronic device creates a full scan list of frequencies based on the PRL file and sequentially captures frequencies in accordance with the list. After capturing the frequencies successfully, the electronic device searches for the strongest pilot, reads communication channel information, and obtains system information/frequency information (SID/NID) of the first communication network. Then, the obtained SID/NID may be matched with the PRL list.

At step 405, when the first match result indicates that first network parameter matches the first communication network, the electronic device is registered with the first communication network and the process ends.

At step 406, when the first search result indicates that the first communication network has not been found or when the first match result indicates that the first network parameter does not match the first communication network, a type of the network parameter read at the time T2 is detected to obtain a first detection result.

Here, at the time T2, when the first communication network has not been found or when the first match result indicates that the first network parameter does not match the first communication network, it is required to detect whether the second network parameter is being read currently, so as to allow the electronic device to be registered with the second communication network as quickly as possible.

At step 407, when the first detection result indicates that the reading of the first network parameter and the reading of the second network parameter have been completed at the time T2, the second communication network is searched for based on the second network parameter, and the electronic device is registered with the found second communication network.

Here, the found second communication network is matched with the second network parameter. The matching operation of the second network parameter with the second communication network is the same as the matching operation of the first network parameter with the first communication network in the step 404, and the description thereof will thus be omitted here.

With the above embodiment of the present disclosure, when the first communication network is found, the electronic device may be registered with the first communication network based on the first network parameter that has been read first. When the first communication network is not found, the second network parameter may be read immediately and the electronic device may be registered with the second communication network based on the read second network parameter. In this way, the time required for the electronic device to find a network after power-on can be effectively reduced since the time for reading the first or second network parameter can be reduced.

Figure 5:
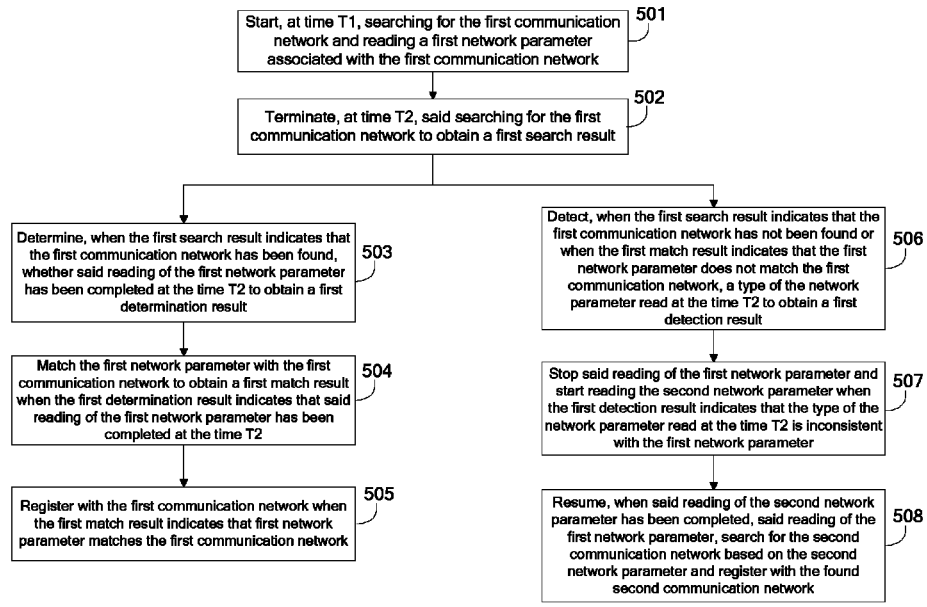
FIG. 5 is a flowchart illustrating a communication method according to a fifth embodiment of the present disclosure.

FIG. 5 is a flowchart illustrating a communication method according to a fifth embodiment of the present disclosure. In this example, the communication method is applied in an electronic device capable of communicating with a first communication network and a second communication network. As shown in FIG. 5, in another preferred embodiment of the present disclosure, the communication method includes the following steps.

At step 501, searching for the first communication network and reading a first network parameter associated with the first communication network are started at time T1.

Typically, the electronic device includes communication modules, such as a card management module, a network management module and a protocol stack module, for reading network parameters from a communication card in the electronic device when the electronic device is powered on. In this embodiment, the communication card can be a UIM card that includes two sets of network parameters: a CDMA network parameter and a GSM network parameter. Here the CDMA parameter may have a higher priority than the GSM parameter, such that the electronic device first searches a CDMA communication network based on the CDMA network parameter. When the search for the CDMA communication network fails, the electronic device then searches for a GSM communication network based on the GSM network parameter. It can be appreciated that the communication method according to this embodiment can be applied to other communication cards including two sets of network parameters, such as a SIM card.

Here, each of the first and second network parameters includes information required for network access, e.g., files such as $EF_{IMSI\_M}$, EFIMSI_T, $EF_{TMSI}$, $EF_{CDMAHOME}$ and Preferred Roaming List (PRL).

In particular, when the electronic device is powered on, an instruction is triggered (this time instant is referred to as T1). The network management module in the electronic device starts searching for the first communication network and, at the same time, the card management module in the electronic device starts reading the first network parameter associated with the first communication network.

By default, a second network parameter associated with the second network parameter is to be read after the reading of the first network parameter has been completed. That is, the first and second network parameters will be read sequentially in case of receiving no stop instruction.

At step 502, at time T2, the searching for the first communication network is terminated to obtain a first search result. Then the method proceeds with step 503 or 506.

Here, the electronic device searches for the first communication network during the time period from the time T1 to the time T2. The first search result can be obtained at the time T2.

The first search result may indicate that the first communication has or has not been found.

At step 503, when the first search result indicates that the first communication network has been found, it is determined whether the reading of the first network parameter has been completed at the time T2 to obtain a first determination result.

In this case, the first communication network has been found at the time T2 and it is then required to determine whether the reading of the first network parameter has been completed.

At step 504, when the first determination result indicates that the reading of the first network parameter has been completed at the time T2, the first network parameter is matched with the first communication network to obtain a first match result.

Here, the step of matching the first network parameter is matched with the first communication network includes the following operations. The electronic device creates a full scan list of frequencies based on the PRL file and sequentially captures frequencies in accordance with the list. After capturing the frequencies successfully, the electronic device searches for the strongest pilot, reads communication channel information, and obtains system information/frequency information (SID/NID) of the first communication network. Then, the obtained SID/NID may be matched with the PRL list.

At step 505, when the first match result indicates that first network parameter matches the first communication network, the electronic device is registered with the first communication network and the process ends.

At step 506, when the first search result indicates that the first communication network has not been found or when the first match result indicates that the first network parameter does not match the first communication network, a type of the network parameter read at the time T2 is detected to obtain a first detection result.

Here, at the time T2, when the first communication network has not been found or when the first match result indicates that the first network parameter does not match the first communication network, it is required to detect whether the second network parameter is being read currently, so as to allow the electronic device to be registered with the second communication network as quickly as possible.

At step 507, when the first detection result indicates that the type of the network parameter read at the time T2 is inconsistent with the first network parameter, the reading of the first network parameter is stopped and the reading the second network parameter is started.

Here, at the time T2 when the first network parameter is being read, it is required to stop the reading of the first network parameter and start reading the second network parameter immediately.

At step 508, at time T3 after the reading of the second network parameter has been completed, the reading of the first network parameter is resumed, the second communication network is searched for based on the second network parameter and the electronic device is registered with the found second communication network.

Here, the found second communication network is matched with the second network parameter. The matching operation of the second network parameter with the second communication network is the same as the matching operation of the first network parameter with the first communication network in the step 504, and the description thereof will thus be omitted here.

Here, after the reading of the second network parameter has been completed, the reading of the first network parameter needs to be resumed until the reading of the first network parameter is completed.

With the above embodiment of the present disclosure, when the first communication network is found, the electronic device may be registered with the first communication network based on the first network parameter that has been read first. When the first communication network is not found, the second network parameter may be read immediately and the electronic device can be registered with the second communication network based on the read second network parameter. In this way, the time required for the electronic device to find a network after power-on can be effectively reduced since the time for reading the first or second network parameter can be reduced.

Figure 6:
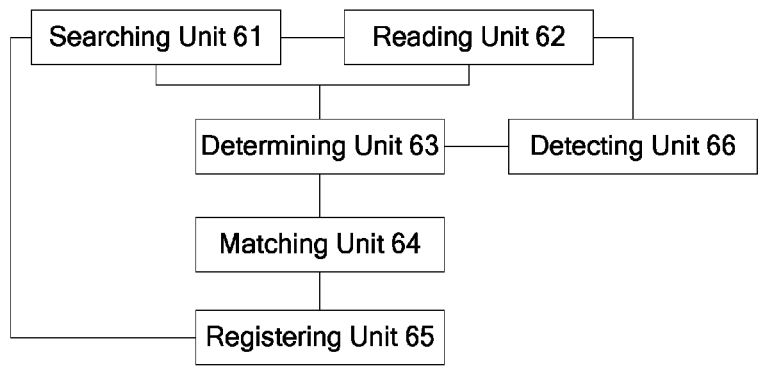
FIG. 6 is a schematic diagram showing a configuration of an electronic device according to a first, fourth or fifth embodiment of the present disclosure.

FIG. 6 is a schematic diagram showing a configuration of an electronic device according to a first, fourth or fifth embodiment of the present disclosure. In this example, the electronic device is capable of communicating with a first communication network and a second communication network, as shown in FIG. 6.

In the first embodiment, the electronic device includes a searching unit 61, a reading unit 62, a determining unit 63, a matching unit 64, a registering unit 65 and a detecting unit 66.

The searching unit 61 is configured to start, at time T1, searching for the first communication network.

The reading unit 62 is configured to start, at the time T1, reading a first network parameter associated with the first communication network and to read, by default, a second network parameter associated with the second network parameter after the reading of the first network parameter has been completed.

The searching unit 61 is further configured to terminate, at time T2, said searching for the first communication network to obtain a first search result.

The determining unit 63 is configured to determine, when the first search result indicates that the first communication network has been found, whether the reading of the first network parameter has been completed at the time T2 to obtain a first determination result.

The matching unit 64 is configured to match the first network parameter with the first communication network to obtain a first match result when the first determination result indicates that the reading of the first network parameter has been completed at the time T2.

The registering unit 65 is configured to register with the first communication network when the first match result indicates that first network parameter matches the first communication network.

The detecting unit 66 is configured to detect, when the first search result indicates that the first communication network has not been found or when the first match result indicates that the first network parameter does not match the first communication network, a type of the network parameter read at the time T2 to obtain a first detection result.

The reading unit 62 is further configured to stop the reading of the first network parameter and start reading the second network parameter when the first detection result indicates that the type of the network parameter read at the time T2 is inconsistent with the first network parameter, and to notify the searching unit 61 at time T3 that the reading of the second network parameter has been completed.

The searching unit 61 is further configured to search for the second communication network based on the second network parameter in response to receipt of the notification from the reading unit 62.

The registering unit 65 is further configured to register with the found second communication network, Here the time T3 is later than the time T2, and the time T2 is later than the time T1.

Preferably, in the fourth embodiment of the present disclosure, the searching unit 61 is further configured to search, when the first detection result indicates that the reading of the first network parameter and the reading of the second network parameter have been completed at the time T2, for the second communication network based on the second network parameter. The registering unit 65 is further configured to register with the found second communication network.

Preferably, in the fifth embodiment of the present disclosure, the reading unit 62 is further configured to resume, when the reading of the second network parameter has been completed, the reading of the first network parameter until the reading of the first network parameter is completed.

It can be appreciated by those skilled in the art that the functions implemented by the respective units of the electronic device shown in FIG. 6 can be understood by referring to the description associated with the above communication methods.

Figure 7:
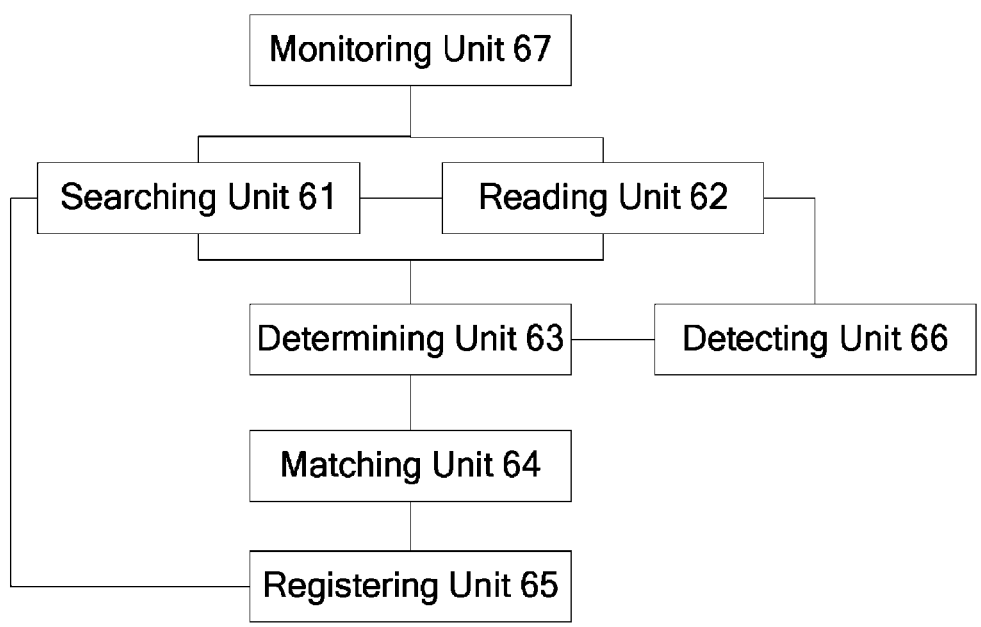
FIG. 7 is a schematic diagram showing a configuration of an electronic device according to a second or third embodiment of the present disclosure.

FIG. 7 is a schematic diagram showing a configuration of an electronic device according to a second or third embodiment of the present disclosure. In this example, the electronic device is capable of communicating with a first communication network and a second communication network, as shown in FIG. 7.

In the second embodiment, the electronic device includes a searching unit 61, a reading unit 62, a determining unit 63, a matching unit 64, a registering unit 65 and a detecting unit 66.

The searching unit 61 is configured to start, at time T1, searching for the first communication network.

The reading unit 62 is configured to start, at the time T1, reading a first network parameter associated with the first communication network and to read, by default, a second network parameter associated with the second network parameter after the reading of the first network parameter has been completed.

The searching unit 61 is further configured to terminate, at time T2, said searching for the first communication network to obtain a first search result.

The determining unit 63 is configured to determine, when the first search result indicates that the first communication network has been found, whether the reading of the first network parameter has been completed at the time T2 to obtain a first determination result.

The matching unit 64 is configured to match the first network parameter with the first communication network to obtain a first match result when the first determination result indicates that the reading of the first network parameter has been completed at the time T2.

The registering unit 65 is configured to register with the first communication network when the first match result indicates that first network parameter matches the first communication network.

The detecting unit 66 is configured to detect, when the first search result indicates that the first communication network has not been found or when the first match result indicates that the first network parameter does not match the first communication network, a type of the network parameter read at the time T2 to obtain a first detection result.

The reading unit 62 is further configured to stop the reading of the first network parameter and start reading the second network parameter when the first detection result indicates that the type of the network parameter read at the time T2 is inconsistent with the first network parameter, and to notify the searching unit 61 at time T3 that the reading of the second network parameter has been completed;

The searching unit 61 is further configured to search for the second communication network based on the second network parameter in response to receipt of the notification from the reading unit 62.

The registering unit 65 is further configured to register with the found second communication network, Here the time T3 is later than the time T2, and the time T2 is later than the time T1.

Preferably, the electronic device further includes a monitoring unit 67 configured to monitor a progress of the reading of the first network parameter when the first determination result indicates that said reading of the first network parameter has not been completed at the time T2, and to notify the matching unit 64 at time T4 that the reading of the first network parameter has been completed.

The matching unit 64 is further configured to match the first network parameter with the first communication network to obtain the first match result in response to receipt of the notification from the monitoring unit 67.

The registering unit 65 is further configured to register with the first communication network when the first match result indicates that first network parameter matches the first communication network.

Here the time T4 is later than the time T2.

Preferably, in the third embodiment of the present disclosure, the electronic device further includes a monitoring unit 67 configured to monitor a progress of the reading of the second network parameter when the first detection result indicates that the type of the network parameter read at the time T2 is consistent with the second network parameter, and to notify the searching unit 61 at time T5 that the reading of the first network parameter has been completed.

The searching unit 61 is further configured to search for the second communication network based on the second network parameter in response to receipt of the notification from the monitoring unit 67.

The registering unit 61 is further configured to register with the found second communication network.

It can be appreciated by those skilled in the art that the functions implemented by the respective units of the electronic device shown in FIG. 8 can be understood by referring to the description associated with the above communication methods.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, or each of these units can be a separate unit, or two or more units can be integrated into one unit. Such integrated unit can be implemented in hardware, possibly in combination with software functional units.

It can be appreciated by those skilled in the art that some or all of the steps in the method embodiment as described above can be implemented by hardware following instructions of a program. Such program can be stored in a computer readable storage medium and, when executed, performs the steps of the above method embodiment. The storage medium may be any of various mediums capable of storing program codes, such as a mobile storage device, a Read Only Memory (ROM), a Random Access Memory (RAM), a magnetic disk or an optical disc.

Alternatively, the integrated units of the present disclosure as described above can be implemented as software functional modules and sold or used as standalone produces. In this case, they can be stored in a computer readable storage medium. In view of this, the technical solutions according to the embodiments of the present application, or in other words a part thereof which makes contribution over the prior art, can be substantially embodied in a form of software product. The computer software product can be stored in a storage medium containing instructions which cause a computer device (which can be a personal computer, a server, a network device or the like) to perform one or more methods according to the embodiments of the present application or particular parts thereof. The storage medium may be any of various mediums capable of storing program codes, such as a mobile storage device, a Read Only Memory (ROM), a Random Access Memory (RAM), a magnetic disk or an optical disc.

While the embodiments of the present disclosure have been described above, the scope of the present disclosure is not limited thereto. Various modifications and alternatives can be made by those skilled in the art without departing from the scope of the present disclosure. These modifications and alternatives are to be encompassed by the scope of the present disclosure which is only defined by the claims as attached.

While the preferred embodiments of the present disclosure have been described above, the scope of the present disclosure is not limited thereto.

What is claimed is:

1. A communication method in an electronic device capable of communicating with a first communication network and a second communication network, the method comprising:

starting, at time T1, searching for the first communication network and reading a first network parameter associated with the first communication network, wherein a second network parameter associated with the second communication network is to be read by default after said reading of the first network parameter is completed;

terminating, at time T2, said searching for the first communication network to obtain a first search result;

determining, when the first search result indicates that the first communication network has been found, whether said reading of the first network parameter has been completed at the time T2, to obtain a first determination result; matching the first network parameter with the first communication network when the first determination result indicates that said reading of the first network parameter has been completed at the time T2, to obtain a first match result; and registering with the first communication network when the first match result indicates that first network parameter matches the first communication network;

detecting, when the first search result indicates that the first communication network has not been found or when the first match result indicates that the first network parameter does not match the first communication network, a type of network corresponding to the network parameter read at the time T2, to obtain a first detection result;

stopping said reading of the first network parameter and starting reading the second network parameter when the first detection result indicates that the type of network corresponding the network parameter read at the time T2 is inconsistent with the first network parameter; and
searching, at time T3 after said reading of the second
network parameter has been completed, for the second
communication network based on the second network
parameter, and registering with the found second communication network,
wherein the time T3 is later than the time T2, and the time
T2 is later than the time T1.

2. The communication method of claim 1, further comprising, when the first search result indicates that the first communication network has been found:
monitoring a progress of said reading of the first network
parameter when the first determination result indicates
that said reading of the first network parameter has not
been completed at the time T2;
matching, at time T4 when it is monitored that said reading
of the first network parameter has been completed, the
first network parameter with the first communication
network to obtain the first match result; and
registering with the first communication network when the
first match result indicates that first network parameter
matches the first communication network,
wherein the time T4 is later than the time T2.

3. The communication method of claim 2, further comprising, upon stopping said reading of the first network parameter and starting reading the second network parameter:
resuming, when said reading of the second network parameter has been completed, said reading of the first network
parameter until said reading of the first network parameter is completed.

4. The communication method of claim 1, further comprising, when the first search result indicates that the first communication network has not been found or when the first
match result indicates that the first network parameter does
not match the first communication network:
monitoring a progress of said reading of the second network parameter when the first detection result indicates
that the type of network corresponding to the network
parameter read at the time T2 is consistent with the
second network parameter; and
searching, at time T5 when it is monitored that said reading
of the second network parameter has been completed,
for the second communication network based on the
second network parameter and registering with the
found second communication network.

5. The communication method of claim 4, further comprising, upon stopping said reading of the first network parameter and starting reading the second network parameter:
resuming, when said reading of the second network parameter has been completed, said reading of the first network
parameter until said reading of the first network parameter is completed.

6. The communication method of claim 1, further comprising, when the first search result indicates that the first communication network has not been found or when the first
match result indicates that the first network parameter does
not match the first communication network:
searching, when the first detection result indicates that both
of said reading of the first network parameter and said
reading of the second network parameter have been
completed at the time T2, for the second communication
network based on the second network parameter and
registering with the found second communication network.

7. The communication method of claim 6, further comprising, upon stopping said reading of the first network parameter and starting reading the second network parameter:
resuming, when said reading of the second network parameter has been completed, said reading of the first network
parameter until said reading of the first network parameter is completed.

8. The communication method of claim 1, further comprising, upon stopping said reading of the first network parameter and starting reading the second network parameter:
resuming, when said reading of the second network parameter has been completed, said reading of the first network
parameter until said reading of the first network parameter is completed.

9. An electronic device capable of communicating with a first communication network and a second communication network, the electronic device comprising:
a searching unit configured to start, at time T1, searching
for the first communication network;
a reading unit configured to start, at the time T1, reading a
first network parameter associated with the first communication network, and to read, by default, a second network parameter associated with the second communication network after said reading of the first network
parameter has been completed;
the searching unit is further configured to terminate, at time
T2, said searching for the first communication network
to obtain a first search result;
a determining unit configured to determine, when the first
search result indicates that the first communication network has been found, whether said reading of the first
network parameter has been completed at the time T2, to
obtain a first determination result;
a matching unit configured to match the first network
parameter with the first communication network to
obtain a first match result when the first determination
result indicates that said reading of the first network
parameter has been completed at the time T2;
a registering unit configured to register with the first communication network when the first match result indicates
that first network parameter matches the first communication network;
a detecting unit configured to detect, when the first search
result indicates that the first communication network has
not been found or when the first match result indicates
that the first network parameter does not match the first
communication network, a type of network corresponding the network parameter read at the time T2, to obtain
a first detection result;
the reading unit being further configured to stop said reading of the first network parameter and start reading the
second network parameter when the first detection result
indicates that the type of network corresponding the
network parameter read at the time T2 is inconsistent
with the first network parameter, and to notify the
searching unit at time T3 that said reading of the second
network parameter has been completed;
the searching unit being further configured to search for the
second communication network based on the second
network parameter in response to receipt of the notification from the reading unit; and
the registering unit being further configured to register with
the found second communication network,
wherein the time T3 is later than the time T2, and the time
T2 is later than the time T1.

10. The electronic device of claim 9, further comprising:
a monitoring unit configured to monitor a progress of said
reading of the first network parameter when the first
determination result indicates that said reading of the
first network parameter has not been completed at the time T2, and to notify the matching unit at time T4 that said reading of the first network parameter has been completed, wherein the matching unit is further configured to match the first network parameter with the first communication network to obtain the first match result in response to receipt of the notification from the monitoring unit, and the registering unit is further configured to register with the first communication network when the first match result indicates that first network parameter matches the first communication network, wherein the time T4 is later than the time T2.

11. The electronic device of claim 10, wherein the reading unit is further configured to resume, when said reading of the second network parameter has been completed, said reading of the first network parameter until said reading of the first network parameter is completed.

12. The electronic device of claim 9, further comprising:

a monitoring unit configured to monitor a progress of said reading of the second network parameter when the first detection result indicates that the type of network corresponding to the network parameter read at the time T2 is consistent with the second network parameter, and to notify the searching unit at time T5 that said reading of the first network parameter has been completed, wherein the searching unit is further configured to search for the second communication network based on the second network parameter in response to receipt of the notification from the monitoring unit, and the registering unit is further configured to register with the found second communication network.

13. The electronic device of claim 12, wherein the reading unit is further configured to resume, when said reading of the second network parameter has been completed, said reading of the first network parameter until said reading of the first network parameter is completed.

14. The electronic device of claim 9, wherein the searching unit is further configured to search, when the first detection result indicates that said reading of the first network parameter and said reading of the second network parameter have been completed at the time T2, for the second communication network based on the second network parameter, and the registering unit is further configured to register with the found second communication network.

15. The electronic device of claim 14, wherein the reading unit is further configured to resume, when said reading of the second network parameter has been completed, said reading of the first network parameter until said reading of the first network parameter is completed.

16. The electronic device of claim 9, wherein the reading unit is further configured to resume, when said reading of the second network parameter has been completed, said reading of the first network parameter until said reading of the first network parameter is completed.

* * * * *